Feb. 13, 1923.
A. KINGSBURY ET AL.
BEARING.
ORIGINAL FILED APR. 5, 1916.
1,444,840.
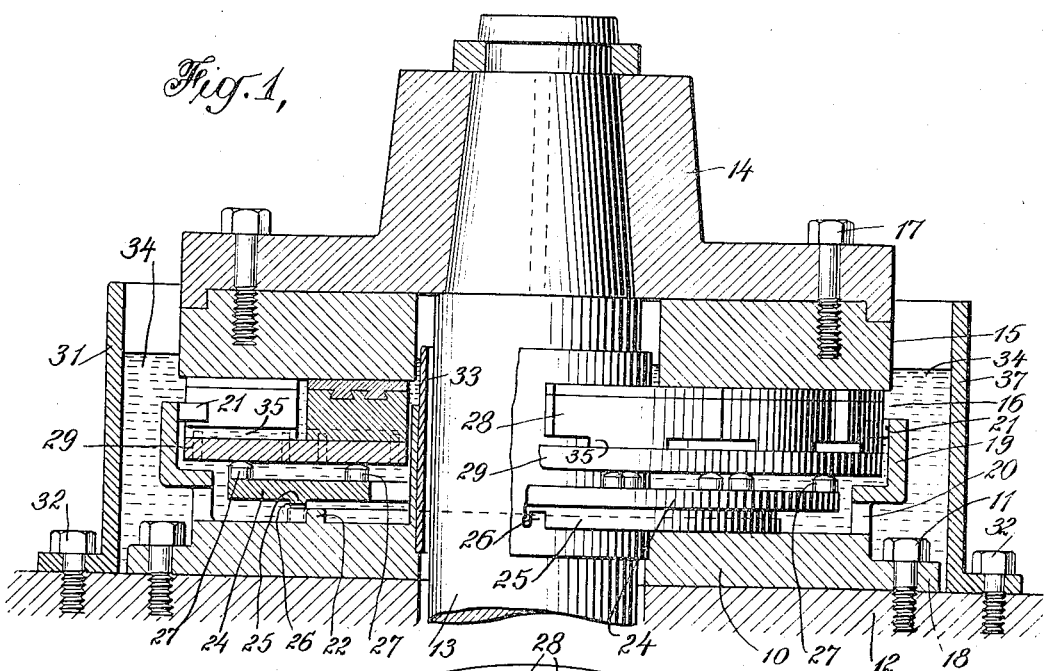
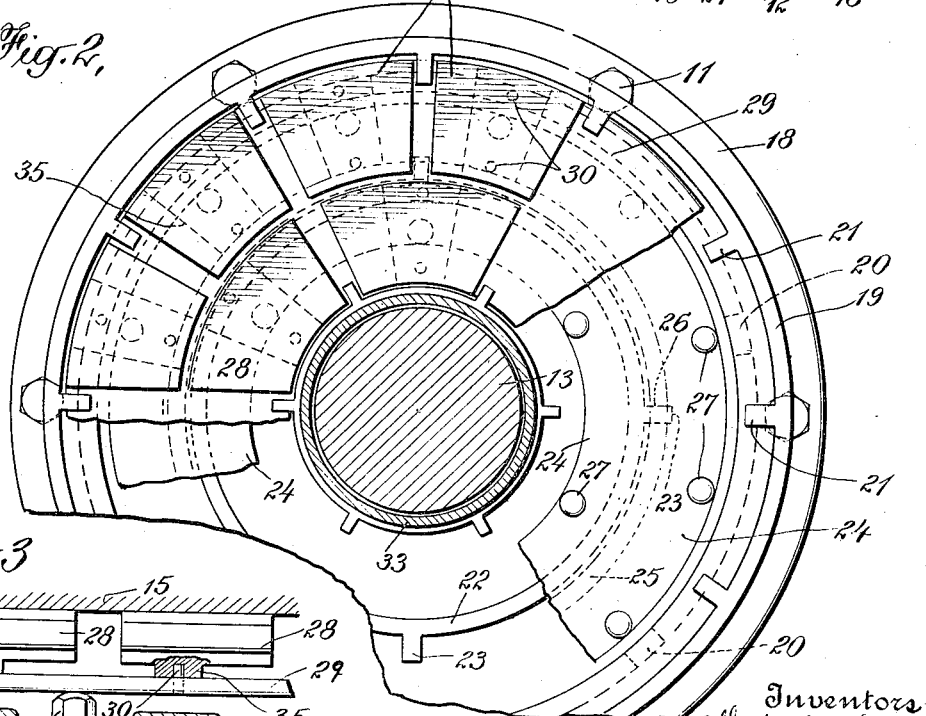
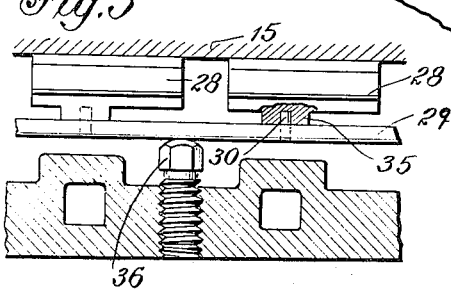
Inventors
Albert Kingsbury
Harry A. S. Howarth
By their Attorneys
Marshall & Dearborn Patented Feb. 13, 1923.

1,444,840

UNITED STATES PATENT OFFICE.

ALBERT KINGSBURY AND HARRY A. S. HOWARTH, OF PITTSBURGH, PENNSYLVANIA; SAID HOWARTH ASSIGNOR TO SAID KINGSBURY.

BEARING.

Original application filed April 5, 1916, Serial No. 89,001. Divided and this application filed August 29, 1917. Serial No. 188,724.

*To all whom it may concern:*

Be it known that we, ALBERT KINGSBURY, a citizen of the United States of America, and a resident of Pittsburgh, Allegheny County, and State of Pennsylvania, and HARRY A. S. HOWARTH, a citizen of the United States of America, and a resident of Pittsburgh, Allegheny County, and State of Pennsylvania, have invented certain new and useful Improvements in Bearings, of which the following is a specification, reference being had to the accompanying drawings, forming a part thereof.

Our invention relates to bearings and, while capable of embodiment in bearings of different types and constructions, has special reference to thrust bearings which are adapted to support heavy loads and comprise annular thrust bearing surfaces with which a plurality of bearing segments or shoes cooperate.

One object of our invention is to provide a bearing with improved means for distributing the pressure among the several bearing segments or shoes with substantial uniformity.

Another object of our invention is to provide a simple and effective equalizing support that is particularly adapted to carry a plurality of bearing segments or shoes arranged in two concentric groups.

Another object of our invention is to provide a bearing comprising a flexible annular member to which a plurality of bearing segments or shoes are removably secured, but with respect to which they are normally immovable.

Another object of our invention is to provide a bearing comprising a plurality of bearing segments which are flexibly connected and mounted on an annular yielding supporting member.

Another object of our invention is to provide a bearing comprising a plurality of flexibly connected bearing segments which are mounted on a yielding, preferably resilient, ring support, preferably so that they may tilt circumferentially in response to the wedging action of the oil and radially to conform with and maintain a proper bearing relation to the opposed bearing member with which said segments cooperate.

Another object of our invention is to provide a bearing comprising a plurality of bearing segments or shoes arranged in concentric groups and flexibly connected into a unitary bearing member.

Another object of our invention is to provide a bearing comprising a plurality of bearing segments or shoes arranged in concentric groups with resilient means for equitably distributing the pressure between the segments of said groups.

In order that our invention may be thoroughly understood, we will now proceed to describe the same in the following specification and then point out the novel features thereof in appended claims. The invention, however, is capable of receiving a variety of mechanical expressions of which that shown on the drawing is for purposes of illustration only and not to be construed as a definition of the limits of the invention, reference being had to the appended claims for the latter purpose.

Referring to the drawings:

Figure 1 is a sectional elevation of a thrust bearing arranged and constructed in accordance with our invention and constituting an embodiment thereof.

Figure 2 is a sectional plan view of the same bearing with certain of the parts broken away to show the structure more in detail.

Figure 3 is a partially sectional elevation of a detail feature of our invention and illustrating the employment of spaced supports.

The structure shown in Figures 1 and 2 comprises an annular base 10, which is secured by bolts 11 or other suitable means to a frame or foundation 12, a shaft 13 which extends through a suitable opening in the frame and through the annular base, a thrust block 14 on the shaft, and bearing members 15 and 16.

The thrust block 14 is keyed or affixed to the shaft 13 by any suitable means and one of the bearing members 15, which is hereinafter designated the thrust collar, is secured to the block 14 by bolts 17 or other suitable means.

The base 10 has a rim 18 through which the bolts 11 extend and is provided with a flange 19 having apertures 20 to permit free circulation of oil therethrough and inwardly extending projections 21 to hold the bearing segments or shoes in position. An outer wall or flange 31 surrounds the bearing members and is suitably secured to the frame or foundation 12, as by bolts 32, and a sleeve 33 surrounds the shaft 13 and is suitably attached to the base 10, the two cooperating to provide a fluid containing reservoir 34.

The base also has an annular bead 22 provided with a plurality of key projections 23 as clearly shown in Figure 2.

Mounted on the base is a yielding annular equalizing support 24 which is sufficiently flexible or resilient to permit it to be readily dished or distorted and which has a downwardly extending bead 25 which fits loosely outside of the bead 22 and is notched at 26 to receive the key projections 23.

Extending upwardly from the equalizing support 24 are a plurality of projections 27 with rounded tops which correspond in number to the bearing segments or shoes 28 forming parts of the bearing member 16.

The bearing member 16 in addition to the segments or shoes 28, which in the form shown are arranged in two concentric rows, comprises a relatively flexible or resilient ring 29 on which the shoes are mounted. They are shown as held in position thereon by dowel pins 30 and readily removable when the thrust collar 15 is not in position, but after the parts are assembled in position the flat engaging faces of the shoes and the ring are pressed into intimate contact by the load on the bearing, and the elements 28 and 29 then constitute, in effect and in action, an integral member.

The shoes 28, as clearly shown in Figure 3, are each preferably provided with a projection or rib 35 which extends radially across the bottom of the shoe and engages the adjacent surface of the ring 29 so that it serves to space the body of the shoe from the ring. In other words the shoes may be of generally T-shaped formation.

The projection or rib 35 may be located at the center of the bottom of the shoe or may be offset to one side of the center as shown in Figure 3. The offset arrangement we consider preferable provided the bearing is intended to operate only in one direction of rotation but the rib is preferably located at the center when the bearing is adapted to rotate in either direction.

The bearing structure may comprise a single annular group of bearing segments or shoes as shown in Figure 3, in which case the shoes are attached directly to a flexible or resilient ring 29 and the latter may be supported on any suitable yielding support or in any other appropriate manner; for example, spherically-headed screws or bolts 36 may be used as illustrated in Figure 3.

In the latter form as shown, the adjusting screws 36 engage the ring 29 at a point between the shoes, preferably midway between the ribs 35 of adjacent shoes. In this arrangement the ring on account of its flexibility serves to a certain extent, as an equalizer to circumferentially distribute the pressure upon the annularly arranged bearing segments or shoes, but the primary object of the resilient ring in each construction herein shown is to permit the bearing segments or shoes to tilt individually when the bearing is in operation to automatically provide for the continuous wedging of lubricating fluid between the bearing surfaces and also provide for any radial rocking or adjustment that they may be necessary to obtain uniform bearing engagement between the bearing segments or shoes and the cooperating thrust collar 15.

The projections 27, as shown in Figures 1 and 2, engage the ring 29 directly below the ribs 35 of the shoes, but they may however be so located as to engage the flexible ring 29 between the shoes, thereby corresponding to the arrangement shown in Fig. 3 and obtaining the benefit of the flexibility of the ring 29 in aiding the equitable distribution of the bearing pressure among the circumferential series of bearing segments, as heretofore explained.

The flexible or resilient ring 24, owing to its intermediate annular support on the bead 25, forms a yielding support that is adapted to effectively equalize or equitably distribute the pressure among the concentric series of bearing segments or shoes, as well as among the segments of each series, because said segments are supported on said ring at points offset radially from the line of its annular support and the latter, owing to its flexibility and resiliency, may dish or distort to permit said segments to individually assume such positions that they respectively carry their proportionate shares of the load.

In other cases the ring 24 may be dispensed with and the ring 29 mounted directly on a single annularly arranged support as disclosed and claimed in application Sr. No. 426,948 filed November 27, 1920, a renewal of application Sr. No. 188,725, filed of even date herewith. The equalizing ring 29 then has the additional function of equalizing the pressure between the two concentric sets of shoes as well as equalizing the pressure upon the shoes of each set.

It will therefore be perceived that a bearing has been provided which comprises a plurality of segmental bearing portions or shoes which are flexibly connected and mounted on an annular yielding supporting member. The flexible or resilient ring with its segmental bearing portions constitutes a unitary bearing member the segmental bearing portions of which, owing to its support, may tilt individually to establish wedge-shaped oil films between the bearing surfaces and effect an equitable distribution of the bearing pressure radially of said surfaces. At the same time said yielding support cooperates with the flexibly connected series of segmental bearing portions to effect an equitable distribution of pressure among the several bearing segments.

It will also be perceived that a bearing has been provided in which a plurality of bearing segments or shoes arranged in concentric series have been flexibly connected into a unitary member which nevertheless permits the respective segments to tilt individually as heretofore explained. Moreover, simple and effective means have been provided for effecting an equitable distribution of the bearing pressure between a plurality of concentric series of bearing segments as well as between the segments of each series.

While we have shown the bearing member which comprises the flexible portion and the segmental bearing portions as a part of the stationary element of the bearing, this member may obviously be a part of the rotating member if desired, in which case the thrust collar would be mounted upon the stationary instead of upon the rotating part. Furthermore, while the bearing has been shown as comprising concentric sets of bearing segments or shoes it is to be expressly understood that the invention is not limited thereto as the flexible connection of bearing segments and their support on a yieldable ring is also applicable to a single annular series of bearing segments. The removable mounting of the segments on the flexible ring and the spacing of the body of said segments from said ring, while possessing important advantages and serving useful purposes, are also not essential to the generic expression of this invention.

Various other structural variations may be embodied within the spirit and scope of our invention, and we intend that only such limitations be imposed as are indicated in appended claims.

This application is a division of our application Sr. No. 89,001, filed April 5, 1916. A yielding support for a single flexibly connected series of bearing segments is not claimed herein, however, as such forms the subject matter of claims in our application Sr. No. 234,063, filed May 17, 1918, which is also a continuation of our application Sr. No. 89,001 above referred to.

What we claim is:

1. A bearing member composed of a flexible ring, and a plurality of concentric sets of shoes supported by the flexible ring.

2. A bearing comprising a resilient ring, and a plurality of T-shaped bearing shoes mounted on the resilient ring and readily removable therefrom when out of engagement with the opposed bearing member.

3. A bearing comprising a flexible ring, spaced supports therefor, and bearing shoes mounted thereon to be readily removed therefrom when out of engagement with the opposed bearing member but constituting with said ring a substantially integral member when engaged with the opposed bearing member, the ring being adapted by its distortion to permit the tilting of the shoes.

4. A bearing comprising a flexible ring, a plurality of bearing shoes mounted thereon in concentric groups, and means for supporting the flexible ring at a plurality of distributed points also arranged in concentric groups corresponding to the groups of shoes.

5. A bearing member comprising a flexible ring having a plurality of upwardly extending projections or pins, and T-shaped bearing shoes removably mounted on the ring and having apertures in the foot of the T for receiving the projections or pins.

6. A bearing member composed of a flexible ring provided with a plurality of concentric sets of bearing segments.

7. A bearing comprising a flexible ring, a plurality of bearing segments mounted thereon in concentric groups, and means for supporting the flexible ring at a plurality of distributed points in such manner as to permit the ring to be distorted and the bearing segments carried thereby to be tilted when the bearing is in operation.

8. A bearing comprising a resilient ring, means for supporting said ring, and a plurality of bearing shoes mounted on said ring to be readily removed therefrom without removing said ring from its support when said shoes are disengaged from the opposed bearing member.

9. A bearing comprising a base, a resilient ring pivotally mounted thereon, a second resilient ring supported on the first ring at a series of separated points, and an annularly arranged series of bearing segments mounted on the second ring.

10. A bearing comprising a base, a resilient ring tiltably supported thereon, a second resilient ring mounted on the first ring in such manner as to be free to flex relatively thereto, and a plurality of bearing shoes having transverse projections or ribs engaging the second resilient ring and serving to space the bodies of the shoes therefrom.

11. A bearing comprising in combination a resilient ring, and a flexibly-connected series of bearing segments supported thereon at a series of separated points.

12. A bearing comprising in combination a base, a resilient ring pivotally mounted thereon, and a ring-shoe member consisting of a resilient ring and relatively rigid shoe parts mounted thereon, the said composite ring-shoe member being supported on the first specified resilient ring at a series of separated points.

13. A thrust bearing comprising a thrust collar, a unitary bearing member having a plurality of concentric rows of shoes with bearing surfaces cooperating with the thrust collar and flexible portions interconnecting the shoes, and an equalizing ring having an annular supporting rib and projections on which the aforesaid bearing member is mounted, the flexible portions of the bearing member being adapted to permit the shoes to be individually tilted by the wedging of the lubricating fluid during the operation of the bearing and the equalizing ring being adapted to equalize the pressure between the concentric rows of shoes.

14. A thrust bearing comprising a thrust collar, a unitary bearing member having a plurality of concentric rows of bearing segments with bearing surfaces cooperating with the thrust collar and flexible portions interconnecting the bearing segments and means adapted to equalize the thrust pressure upon the concentric rows of bearing segments.

15. A bearing comprising a base, an equalizing ring having an annular supporting rib on one side and outwardly extending projections on the opposite side disposed on opposite sides of the rib, and a bearing member comprising a flexible ring mounted on the projections of the equalizing ring and bearing segments on the flexible ring in a plurality of concentric annular rows.

16. A bearing comprising a resilient ring having a concentric annular rib constituting a support, and a plurality of bearing segments mounted on the resilient ring to tilt with respect thereto.

17. A bearing comprising a resilient ring having an annular rib constituting a support and a plurality of oppositely extending projections arranged in concentric rings on opposite sides of the supporting rib, and a plurality of bearing segments tiltably mounted on the oppositely extending projections.

18. A bearing comprising an annular equalizer having a relatively narrow rib or bead projecting to form a support, a plurality of oppositely extending projections, and a plurality of bearing members pivotally supported on the projections.

19. A bearing comprising an annular equalizing member, a plurality of bearing segments pivotally mounted thereon and arranged in concentric annular groups, and means for supporting the equalizer substantially at its mean radius to equitably distribute the pressure between the groups of bearing segments.

20. A bearing comprising an annular equalizer and a plurality of bearing segments pivotally mounted thereon in concentric annular groups, said equalizer being provided with an annular supporting projection substantially at its mean radius whereby the equalizer is adapted to be distorted to distribute the pressure between the groups of bearing segments.

21. A bearing comprising a plurality of bearing segments and an equalizing member comprising a resilient ring having circumferentially arranged projections on which said segments are tiltably mounted.

22. A bearing comprising a plurality of bearing segments and an equalizing member comprising a resilient ring having circumferentially arranged projections on which said segments are tiltably mounted and annularly arranged supporting means by which said equalizing member is tiltably mounted.

23. A bearing comprising a plurality of bearing segments and an equalizing member comprising a resilient ring having circumferentially arranged projections on which said segments are mounted to tilt both radially and circumferentially of the bearing.

24. A bearing comprising a plurality of bearing segments and an equalizing member comprising a resilient ring having circumferentially arranged projections on which said segments are mounted to tilt both radially and circumferentially of the bearing and annularly arranged supporting means by which said equalizing member is mounted to tilt radially of the bearing.

25. A bearing comprising a plurality of concentric rows of bearing segments and a flexible ring on which said segments are mounted.

26. A bearing comprising a plurality of concentric rows of bearing segments, a flexible ring on which said segments are mounted, and annularly-arranged supporting means for said ring.

27. A bearing comprising a plurality of concentric rows of bearing segments, a flexible ring on which said segments are mounted, and relatively narrow annularly arranged supporting means on which said ring may tilt radially of the bearing.

28. A bearing comprising a plurality of concentric rows of bearing segments, a flexible ring on which said segments are mounted, and means for mounting said ring comprising annularly arranged supporting means positioned intermediately of said rows of bearing segments.

29. A bearing comprising a plurality of concentric rows of bearing segments and an equalizing support therefor comprising a flexible ring having circumferentially arranged projections on which said segments are tiltably mounted.

30. A bearing comprising a plurality of concentric rows of bearing segments and an equalizing support therefor comprising a flexible ring having circumferentially arranged projections on which said segments are tiltably mounted and an annularly arranged supporting means by which said ring is tiltably mounted.

31. A bearing comprising a plurality of concentric rows of bearing segments and an equalizing support therefor comprising a flexible ring having circumferentially arranged projections on which said segments are mounted to tilt both radially and circumferentially of the bearing.

32. A bearing comprising a flexible equalizing ring and a flexibly-connected series of bearing segments tiltably mounted thereon.

33. A bearing comprising a plurality of concentric rows of bearing segments and means for equalizing the pressure between said segments comprising a flexible ring on which said segments are mounted and annularly arranged supporting means for permitting the flexure of said ring.

34. A bearing comprising a plurality of concentric rows of bearing segments, a flexible ring on which said segments are mounted, and means for equalizing the pressure between said segments comprising a flexible ring on which said first named ring is mounted.

35. A bearing comprising a flexibly connected series of bearing segments and a yielding equalizing ring on which said series of bearing segments is mounted.

36. A bearing comprising a flexible ring and a series of bearing segments having flexible connections mounted on said flexible ring to tilt both radially and circumferentially of the bearing.

37. A bearing comprising a flexible ring having a relatively narrow annular support and a series of bearing segments having flexible connections mounted on said flexible ring.

38. A bearing comprising a flexible ring having a relatively narrow annular support and oppositely-extending projections, and a flexibly-connected series of bearing segments tiltably mounted on said projections.

39. An equalizing member for bearings comprising a flexible ring provided with an annular supporting projection substantially at its mean radius and a plurality of projections for tiltably supporting bearing segments.

40. A bearing comprising a plurality of concentric rows of bearing segments, a flexible ring on which said segments are mounted, and means for equitably distributing the pressure between said rows of segments.

41. A bearing comprising a plurality of concentric rows of bearing segments and an equalizing support therefor comprising a flexible ring and an annular rib on which said ring is mounted to flex.

42. A bearing comprising a flexible ring provided with a plurality of concentric sets of bearing segments and means for supporting said ring to permit the flexure of the same.

43. A bearing comprising a base, a flexible ring pivotally mounted thereon, and a series of bearing segments having flexible connections mounted on said flexible ring.

44. A bearing comprising a plurality of concentric rows of bearing segments, a flexible ring on which said segments are mounted, and means for equalizing the pressure between said segments comprising a second flexible ring and annularly arranged supporting means on which said second flexible ring is mounted to flex.

45. A bearing comprising relatively rotatable bearing members one of which includes a plurality of concentric rows of bearing segments, and resilient means for equalizing the bearing pressure on said segments.

46. A bearing comprising relatively rotatable bearing members one of which includes a plurality of concentric rows of bearing segments, and a flexible ring on which said segments are mounted, said ring being supported to permit the same to flex and equitably distribute the bearing pressure between said segments.

47. A bearing comprising relatively rotatable bearing members one of which includes a plurality of concentric rows of bearing segments, and resilient means for equalizing the pressure on said concentric rows of bearing segments.

48. A bearing comprising relatively moving bearing members in contact with one another and receiving the bearing pressure one from the other, one of said members being flexible and comprising concentric rows of bearing segments, and supporting means associated with said latter bearing member affording it diffusely-distributed yielding support.

49. A bearing comprising an annular flexible member having a bearing surface divided into a plurality of concentric sets of bearing segments flexibly connected by said member and yielding supporting means for said flexible member.

50. A bearing including a resilient ring mounted so as to be capable of flexing, and a second resilient ring having segmental bearing surfaces and mounted on said first ring so as to be capable of flexing with respect thereto.

51. In a bearing, the combination of a flexible bearing member comprising a plurality of segmental bearing portions flexibly connected by said member, and a series of separate resiliently-mounted supports for the said bearing portions.

52. In a bearing, the combination of a bearing member comprising a plurality of spaced relatively rigid bearing portions with interposed flexible connecting portions, and circumferentially-spaced supports for the bearing member arranged to automatically effect the equalization of the load on the bearing surfaces.

53. In a bearing, the combination of a bearing member comprising a plurality of spaced relatively rigid bearing segments with interposed flexible connecting portions, and means for supporting the bearing member to permit the tilting of the bearing segments and to also automatically effect the equalization of the load thereon.

54. A bearing comprising a base, a bearing member consisting of a resilient ring portion with a series of substantially T-shaped shoes mounted thereon, and spacing means interposed between the base and the adjacent face of the bearing member and adapted to effect the automatic equalization of the load on the bearing surfaces.

55. A bearing comprising an annular flexible member having a bearing surface divided into segments flexibly connected by said member, and a resilient ring for supporting said flexible member and cooperating therewith in the automatic equalization of the pressure on said segments.

56. A bearing comprising an annular flexible member having a bearing surface divided into segments flexibly connected by said member, and a resilient ring for supporting said flexible member and permitting said segments to tilt when the bearing is in operation.

57. A bearing comprising a flexible member having a bearing surface divided into segments, and a resilient ring cooperating therewith to permit the segments to tilt both radially and tangentially when the bearing is in operation.

58. A bearing comprising relatively moving bearing members in contact with one another and receiving the bearing pressure one from the other, one of said members being flexible, and a resilient ring associated with said latter bearing member throughout its bearing surface for automatically transferring excess pressure on any portion of such surface to other portions thereof.

59. A bearing comprising relatively moving bearing members in contact with one another and receiving the bearing pressure one from the other, one of said members being flexible, and a resilient ring associated with said latter bearing member affording it diffusely distributed yielding support, so that said latter bearing member may yield locally at any portion of its bearing surface.

60. A bearing comprising a relatively rigid member having a bearing surface, a relatively flexible member having a cooperating bearing surface, and a resilient ring for supporting said flexible member.

61. A bearing comprising a relatively rigid member having a bearing surface, a relatively flexible member having a cooperating bearing surface, and a resilient ring for supporting said flexible member, at least one of said bearing members having passages through which oil may be delivered to said bearing surfaces.

62. A bearing comprising relatively movable bearing members in contact with one another and receiving the bearing pressure one from the other, one of said members comprising an annular flexible member having a bearing surface divided into concentric series of segmental bearing portions flexibly connected by said member, and supporting means associated with said flexible bearing member for automatically transferring excess pressure on any portion of said member to other portions thereof.

63. A bearing comprising a relatively rigid member having a bearing surface, an annular, relatively-flexible member having segmental bearing portions flexibly connected by said member, and a resilient ring for supporting said flexible member whereby said member may yield under the wedging action of the oil between said segmental bearing portions and said bearing surface when the bearing is in operation.

64. A bearing comprising a relatively rigid member having a bearing surface, an annular, relatively-flexible member having a bearing surface divided into concentric series of segmental bearing portions flexibly connected by said member, and means adapted to resiliently support said bearing portions and permit said member to flex circumferentially under the wedging action of the oil films between said segmental bearing portions and said bearing surface when the bearing is in operation.

65. A bearing comprising an annular flexible member having a bearing surface divided into concentric series of segments, and resilient means cooperating therewith for automatically transferring excess pressure on any portion of said member to other portions thereof.

66. A bearing comprising an annular flexible member having a bearing surface divided into concentric series of segments flexibly connected by said member, and yielding supporting means cooperating therewith to permit said segments to tilt when the bearing is in operation.

67. A bearing comprising an annular flexible member having a bearing surface divided into relatively rigid segments flexibly connected by said member, and supporting means cooperating therewith whereby excessive pressure on any portion of said member is automatically transferred to other portions thereof.

In witness whereof we have hereunto set our hands this 27 day of August, 1917.

ALBERT KINGSBURY.
HARRY A. S. HOWARTH.